United States Patent [19]

Polstorff

[11] 4,163,977
[45] Aug. 7, 1979

[54] DOUBLE LOOP RECEIVER-TRANSMITTER COMBINATION

[76] Inventor: Jürgen K. Polstorff, 702 Drake Ave., Huntsville, Ala. 35802

[21] Appl. No.: 862,905

[22] Filed: Dec. 21, 1977

[51] Int. Cl.$^2$ .......................... G01S 5/16; H04B 5/00; H04B 15/00
[52] U.S. Cl. ................................. 343/112 R; 325/28; 325/371; 343/112 D; 343/719
[58] Field of Search ............... 343/112 D, 112 R, 719; 340/551; 325/28, 371

[56] References Cited

U.S. PATENT DOCUMENTS

| | | | |
|---|---|---|---|
| 2,992,325 | 7/1961 | Lehan | 343/719 X |
| 3,046,549 | 7/1962 | Kalmus | 343/112 D X |
| 3,900,878 | 8/1975 | Tsao | 343/112 R |
| 3,975,735 | 8/1976 | McCullough et al. | 343/112 R |

Primary Examiner—Maynard R. Wilbur
Assistant Examiner—Richard E. Berger
Attorney, Agent, or Firm—Mitchell B. Wasson

[57] ABSTRACT

A double loop receiver used in conjunction with a transmitter broadcasting at low frequencies as a vertical magnetic dipole. The two loops are connected with their planes parallel in a resonant circuit, thereby cancelling atmospherics generated by distant thunderstorms and allowing the receiver to receive only the signal produced by the near transmitter. The loops are rotated around a horizontal axis perpendicular to the connecting line between the loops until a maximum signal is obtained. The direction of the connecting line is varied until the maximum signal shows the gradient and the direction to the transmitter. By noting the position of the loops and the loop angles with respect to the horizontal, the position of a transmitter buried in the ground can be determined. This system has particular utility in locating lost miners buried in a cave-in. Additionally, the double loop receiver concept can be used to detect subsurface ore deposits.

6 Claims, 5 Drawing Figures

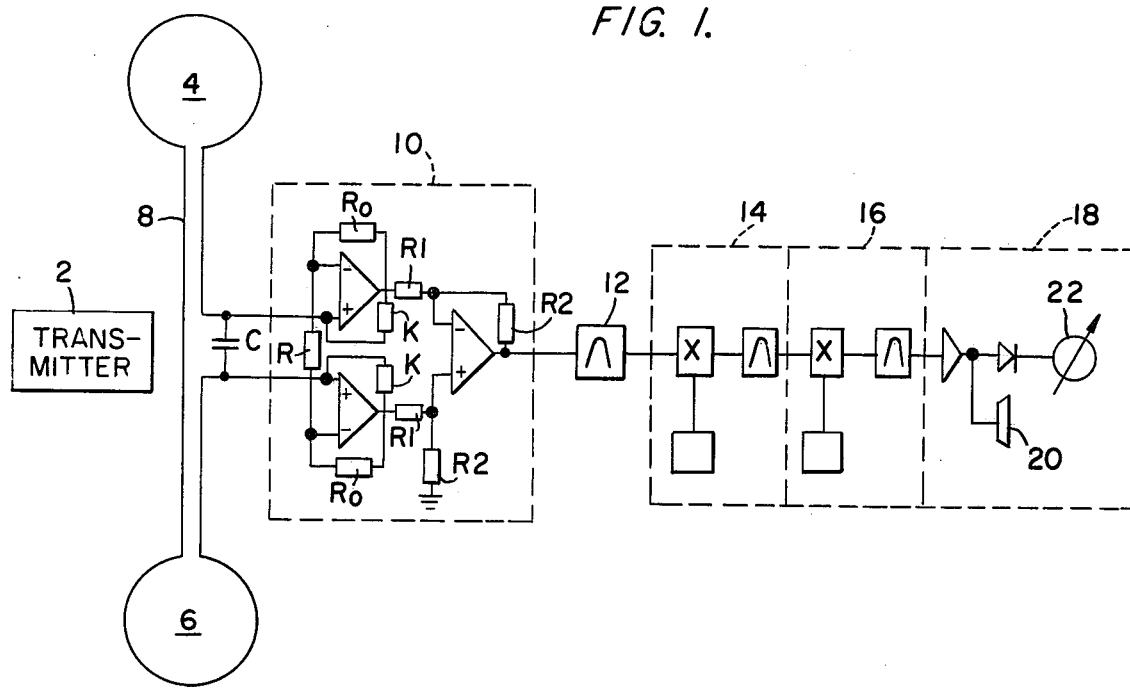
FIG. 1.
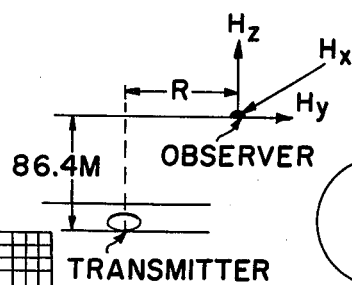
FIG. 2.
f = 2750 Hz
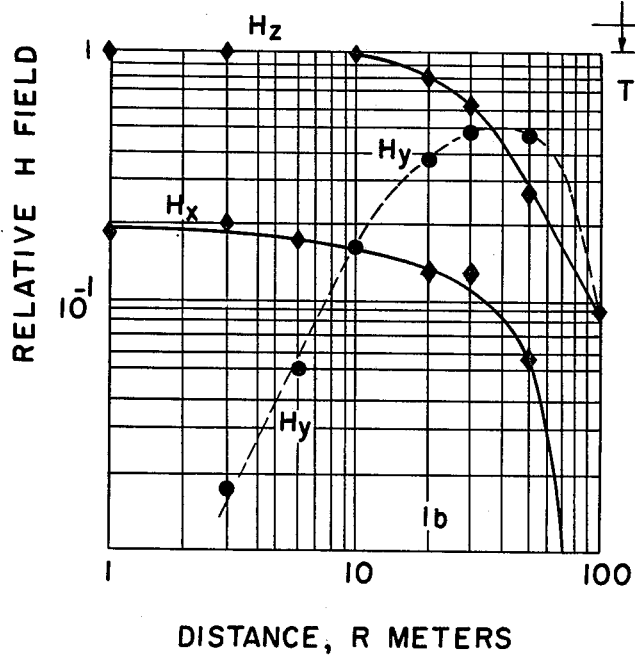
FIG. 3.
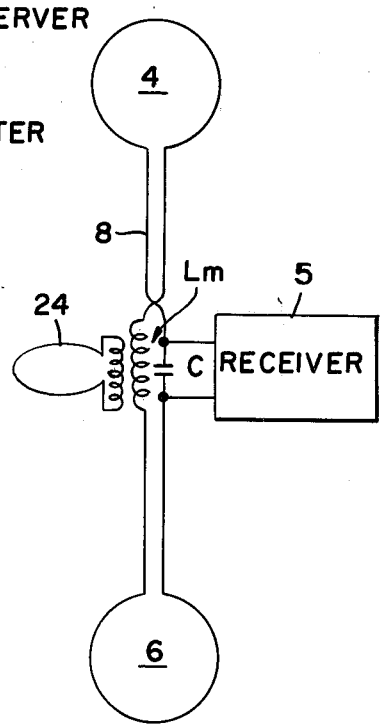

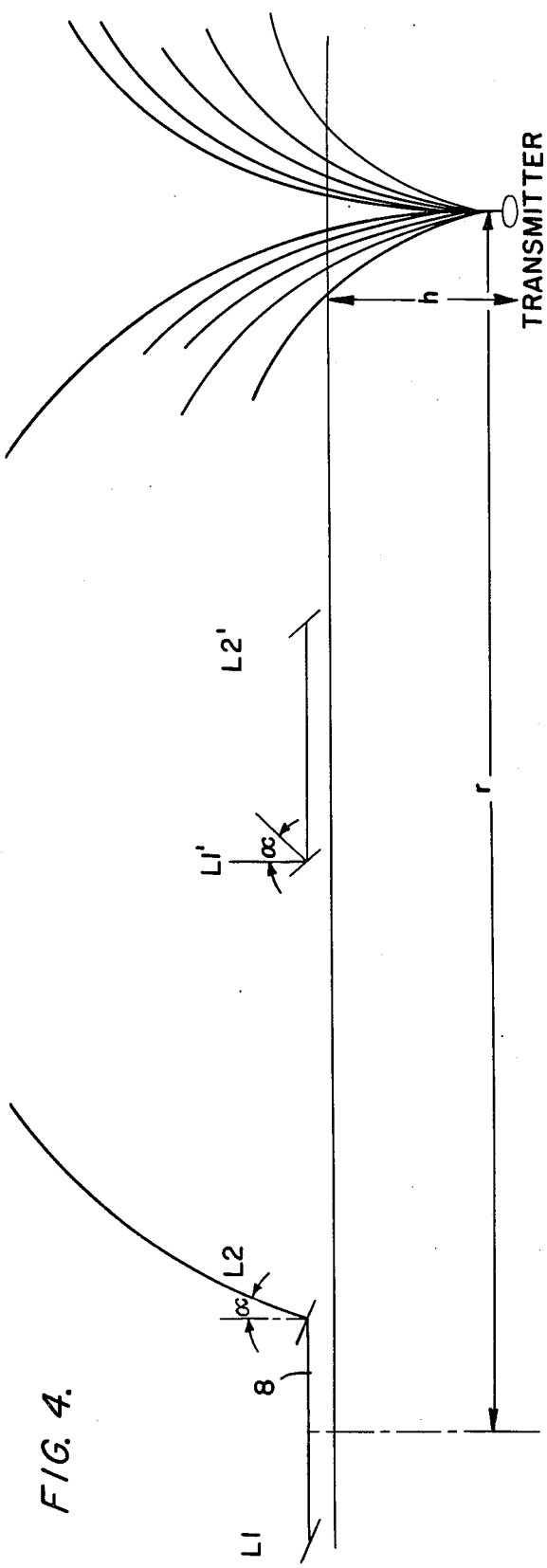
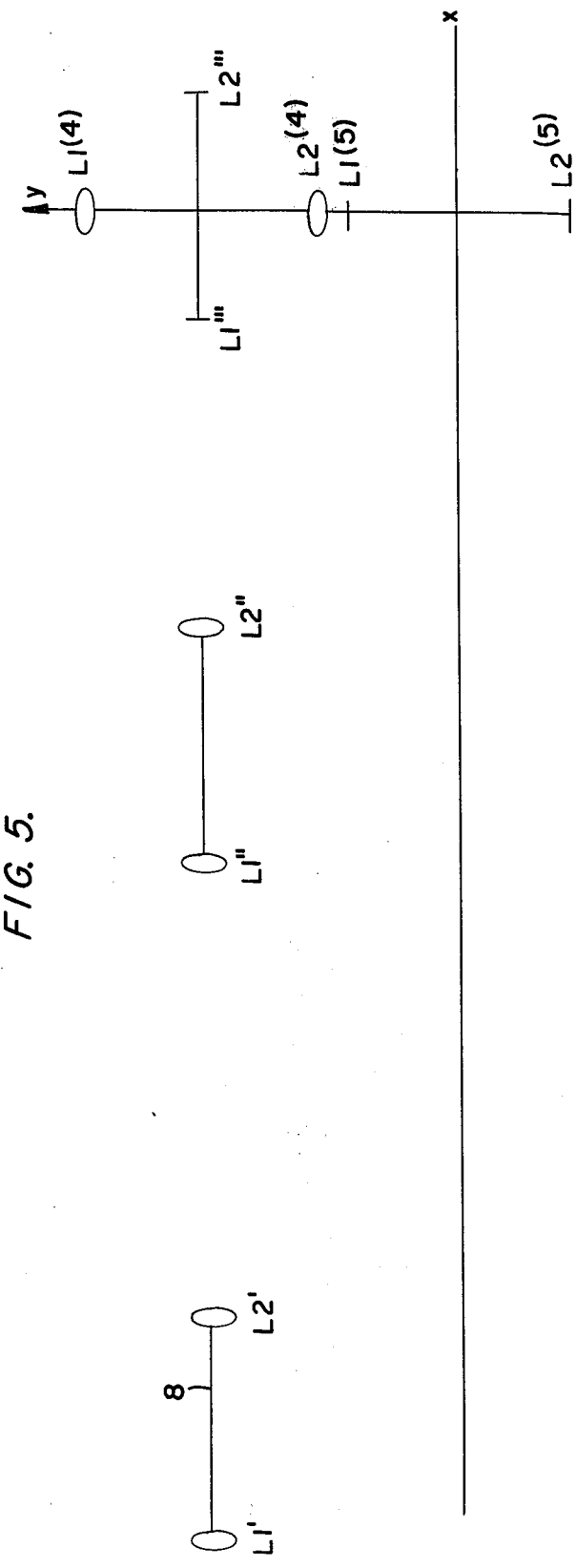
FIG. 4.
FIG. 5.

4,163,977

DOUBLE LOOP RECEIVER-TRANSMITTER COMBINATION

FIELD OF THE INVENTION

The present invention is broadly directed to receivers which would cancel the effects of atmospherics. More particularly, these receivers would allow the position of an underground transmitter to be determined.

BACKGROUND OF THE INVENTION

The use of radio transmission between the surface and miners located deep underground using high frequencies has been considered as early as the 1920's in such works as "Underground Signaling with Radio Sets" by C. L. Colburn, C. M. Bouton, and H. B. Freeman, U.S. Bureau of Mines, R. I. 2407, 1922; "Radio as a Method of Underground Communication in Mines" by J. J. Jakosky, U.S. Bureau of Mines, R. I. 2599, 1924; "Factors Retarding Transmission of Radio Signals Underground, and Some Further Experiments and Conclusions" by J. J. Jakosky and D. N. Zellers, U.S. Bureau of Mines, R. I. 2561, 1924; and "Experiments in Underground Communication Through Earth Strata" by L. C. Ilsely, H. B. Freeman and D. N. Zellers, U.S. Bureau of Mines, T. P. 433, 1928.

In recent years, attention has shifted from the use of high frequencies to the use of low frequencies such as 300—5000 Hz. This work has been documented in "Radio Transmission to and from Underground Coal Mines, Theory and Measurement" by D. B. Lange, L. Ball and A. J. Farstad, I.E.E.E. Transaction on communication Vol. Com-21, March 1973.

Additionally, work has been undertaken relating to the use of prospecting by creating currents in subsurface ore deposits. This work is documented in the paper "AFMAG—Airborne and Ground" by S. H. Ward, Geophysics, Vol. XXIV, No. 4 (October 1959), pp. 761–789. This work recognizes that atmospheric noise would affect the signal generated by the ore deposits, and uses the atmospheric noise as a primary field. In the audio frequency range, this field penetrates deep enough into the soil to excite eddy currents in subsurface ore deposits of high conductivity. The resulting distortion of the electromagnetic field on the surface, indicated by the "strike angle" and the "dip angle", allows conclusions as to the size and depth of the deposit. However, this approach does not cancel the atmospheric noise, but merely utilizes it in determining the position and extent of the deposit.

U.S. Pat. No. 3,777,267 issued to Van der Floe et al discusses a method and apparatus for locating people who are buried underground. As described in this patent, the transmitter and receiver are contained in a single unit. The receiver stage contains an antenna and an input circuit selectively adjustable to at least two different levels by utilization of a transistor and an operational amplifier for receiving and amplifying the input signal. However, this device does not mention or take into account the presence of atmospheric noise in the area of search.

U.S. Pat. No. 3,508,238 issued to Buford M. Baker discloses an intrusion detection system utilizing a double loop. This double loop configuration utilizes the earth's magnetic field to detect entry into a given area.

None of these prior art references suggest the use of a double loop receiver which acts to cancel atmospherics so that the position of a subsurface transmitter can be ascertained.

SUMMARY OF THE INVENTION

The present invention is directed to the use of a double loop receiver for cancelling the effects of atmospherics on signals transmitted from below the surface of the ground. The subsurface transmitter generates a magnetic field of sufficiently low frequency (such as between 100 and 10,000 Hz.) for penetrating the soil between the transmitter and the surface. Combined with an above-ground receiver consisting of two equal parallel loops, a communication link is formed applicable for detection and location of lost miners or cave explorers or any other person located under the earth. The double loop configuration of the receiver antenna eliminates the high level of electromagnetic atmospheric noise primarily caused by distant thunderstorms, direct audio frequency energy from the sun filtering through the ionosphere, the gyromagnetic effect caused by the generation of audio frequency magnetic fields by interaction of the corpuscular radiation from the sun with the ionosphere in the presence of the earth's main magnetic field, the generation of audio frequency magnetic fields by interaction of meterorites and the ionosphere, and man-made noise caused by nuclear explosions, jet vapor tracks, cables or the like.

The antenna of the receiver unit consists of two equal loops with their planes parallel in a resonant circuit, thereby effectively cancelling out a significant portion of the atmospherics while allowing the receiver to still respond to the signal of the near transmitter embodied in the present invention. This particular configuration will reduce the requirements for power of the subsurface transmitter at the expense of increased sophistication of the receiver-direction finder on the surface.

The two loops are each rotated around a horizontal axis perpendicular to the connecting line between the loops until a maximum signal is obtained, also the connecting line being rotated with the center between the two loops fixed. The direction of the largest maximum signal indicates the direction to the transmitter. By noting the position of the loops and the loop angles with respect to the horizontal, the surface position of a transmitter buried in the ground can be determined. Additionally, the double loop receiver concept can be employed to detect subsurface ore deposits.

Further objects, advantages, modes, and embodiments of this invention will become obvious to those skilled in the art by reference to the Brief Description of a Preferred Embodiment and accompanying drawings which illustrate what are presently considered to be preferred embodiments of the best modes contemplated for utilizing the novel principles set forth in the claims.

BRIEF DESCRIPTION OF THE DRAWINGS

FIG. 1 is a schematic of the receiver and transmitter;

FIG. 2 is a graph of the measured relative field strength of a vertical dipole buried in the ground vs. distance;

FIG. 3 is an alternate embodiment of the receiver shown in FIG. 1;

FIG. 4 is a drawing showing the relationship between the distance of the two loops away from the transmitter and the tilt angle; and FIG. 5 is a drawing showing successive positions of the approach of the double loop to the transmitter.

DETAILED DESCRIPTION OF A PREFERRED EMBODIMENT

As shown in the figures, an active vertical magnetic dipole (transmitter) is buried below the surface of the earth to a depth h. The transmitter can be attached to, or in possession of, any individual who is traveling beneath the earth's surface. These individuals could be miners, cave explorers, or any other such person. The transmitter 2 generates a magnetic field of a sufficiently low frequency (between 100 and 10,000 Hz.) to penetrate the soil between the transmitter 2 and the surface. Only low frequencies should be used since, due to the conductivity of the soil, electromagnetic fields generate eddy currents which attenuate electromagnetic radiation in the soil so strongly that only the very low frequency radiation can penetrate such depths that are encountered in mines.

When used in conjunction with a receiver 5, a communication link is established for locating the geographic position of the buried transmitter 2. Due to the low frequencies on which the communication link operates, the magnitude and phase of the atmospherics varies little in the range over which the link operates. However, in contrast, the magnetic field of the transmitter declines with distance as shown in FIG. 2. This figure describes the measured relative field strength of the transmitter with regard to distance from the source. It is because of this fast attenuation of the signal when compared to the high level of atmospheric noise that mandates the elimination of the atmospherics while allowing efficient response to the generated signal.

The atmospherics are eliminated by using two identical loops 4 and 6 in receiver 5 separated by a connecting cable 8. The loops 4 and 6 are separated by a distance of at least h/2 where h is the estimated depths of the transmitter or by at least 10-20% of the estimted distance to the transmitter. The loops are connected with opposing induced atmospheric noise and with their planes parallel in a resonant circuit. This resonant circuit cancels out the atmospherics and produces a substantially improved signal/noise ratio. Additionally, it has been determined that particular efficiency can be achieved if the loops 4 and 6 are separated by a distance which is small compared with the wavelength of the radiation to which the circuit is tuned (for example, for f=2000 Hz, the maximum phase difference is 0.24°/100m).

When the attenuated magnetic signal escapes to the surface, it has to compete with the "noise" generated by electrical discharges in the atmosphere as has been discussed hereinabove. The very low frequency components of this atmospheric radiation is contained in a cavity formed by the ionosphere and by the surface of the earth (for example, f=2000 Hz, the magnetic field strength atmospheric noise for 1 Hz bandwidth is $H = 3.10^{-8} A/m$). Conventional antennas would not prove effective for use in locating a buried transmitter, because the atmospherics would still be received. The double loop embodiment of the present invention receives the magnetic signal largely without the atmospherics. This is accomplished because the two loops are identical in nature and are connected to form a resonant circuit with equal but opposing "noise" electromotive force (emf), thereby cancelling out the atmospheric noise to the receiver. However, the signal emf's induced in both loops do not cancel and a substantial improvement in signal/noise ratio results. Even with moderately sized loops (diameter > 1m), an improvement by a factor of 100 or more is possible, dependent upon the degree of cancellation of the atmospherics.

The fact that the double loop receiver receives a signal only moderately smaller than a single loop would receive is shown in Table 1. This table is based upon measurements of the field of a buried dipole published by Westinghouse Electric Corporation Special Systems, Baltimore and is shown in FIG. 2 for f=272 Hz. Signal values for the double loop system were calculated for a separation of 20 and 40 meters between the two loops and compared with the signal received by a single loop.

TABLE 1

| | | | | | ΔR = 20m | | | ΔR = 40m | | |
|---|---|---|---|---|---|---|---|---|---|---|
| R | $H_z$ | $H_y$ | $\theta = \tan^{-1} H_y/H_z$ | H | α | ΔE | $\Delta E / \sqrt{H_1 H_2}$ | α | ΔE | $\Delta E / \sqrt{H_1 H_2}$ |
| 0 | 1 | 0 | 0 | 1 | −62.3 | .3 | .321 | −41.7 | .62 | .84 |
| 10 | .95 | .14 | 8.4 | .95 | | | | | | |
| 20 | .86 | .27 | 17.45 | .90 | −23.6 | .35 | .44 | | | |
| 30 | .72 | .37 | 26.20 | .808 | | | | | | |
| 40 | .54 | .41 | 37.20 | .677 | 8.6 | .31 | .56 | 18.1 | .402 | .86 |
| 50 | .38 | .40 | 46.5 | .551 | | | | | | |
| 60 | .28 | .37 | 52.9 | .464 | 36.6 | .15 | .39 | | | |
| 70 | .22 | .33 | 56.3 | .396 | | | | | | |
| 80 | .16 | .28 | 60.3 | .322 | 26.1 | .068 | .261 | | | |
| 90 | .11 | .24 | 65.4 | .264 | | | | | | |
| 100 | .07 | .20 | 70.7 | .211 | | | | | | |

H is the magnitude of the magnitude of the magnetic field vector, θ is the angle of the vector against the vertical, α is the angle between the vertical and normal loop plane for maximum signal strength, ΔE is the fraction of the signal received by a single loop at R=0, $\Delta E \sqrt{H_1 H_2}$ is the signal as a fraction of what a single loop would receive at an intermediate distance $R = \sqrt{R_1 R_2}$.

FIG. 1 shows a diagram of the transmitter-receiver communication link. The transmitter 2 could be used in conjunction with a standard transmitting-receiving unit used to keep the miner or other individual in contact with the surface. It is light and its electrical power supply could be self contained or also used to operate a light source such as a lamp. For power conservation, operation of the transmitter is in short periodic bursts and could be synchronized with precise pulses such as is present in electronic watches. Additionally, the quartz oscillator of the electronic watch circuitry can also be used to control the transmitter frequency. A ferrite rod may be used as the antenna of the transmitter due to its compactness.

The receiver includes two identical loops 4 and 6 separated by a cable 8 to a distance at least ½ of the estimated depth h at which the transmitter is located, or by at least 10-20% of the approximate distance from the transmitter 2, whichever distance is larger. To effectively cancel the atmospherics, it is of the utmost importance that the area and number of turns in each loop be equal. The quality of the loops (ωL/R) is also most important since it contributes to the selectivity and reduces the effects of disturbances outside the frequency of the transmitter 2. The quality Q accentuates the response of the loop to the magnetic field and reduces the effect of electrically induced disturbances. The adverse effect of proximity can be avoided by using insulation of standard thickness. Typically at f=2000 Hz, a loop with 1000' gauge 20 wire and 2' diameter has a Q of 40.

An instrumentation amplifier input circuit 10 is connected to the double loops. This circuit reduces the damping of the input through feedback resistors K and therefore increases the selectivity of the receiver. The instrumentation amplifier 10 has high common mode rejection and high input impedance for preventing electrical common mode excitation of the loops. Other measures for protecting against this excitation would include shielding the loops and also grounding the center of the connecting cable 8. The gain of the instrumentation amplifier 10 is gain = (2R+Ro)/R.

An active bandpass filter 12 is electrically connected to the instrumentation amplifier 10. This filter has high selectivity and would be of particular benefit in rejecting lower frequency disturbances. A filter such as Cermetek CH 1290 could be utilized for this purpose.

The signal next passes through an intermediate frequency amplifier stage 14 including a mixer and a local oscillator and an active bandpass filter such as a Cermetek CH 1290. A second mixer stage 16 is used to convert the signal to an output frequency of preferably 800 Hz. This stage also includes a bandpass filter such as the Cermetek CH 1290. The signal is next transmitted to an output stage 18 including a loudspeaker 20 and an indicator 22 usd for quantitative evaluation of the signal.

The entire receiver 5 should have a gain in excess of $10^6$ and have low noise input, active filters with high Q, narrow bandpass for high selectivity, mixer stages for frequency conversion to avoid the danger of feedback instability and an output stage with a loudspeaker for indication and an evaluator having long term averaging for quantitative measurements A second embodiment of the double loop is shown in FIG. 3. The center loop 24 is rotated around a vertical axis to a position in which it has no effect on the tilt angle of the loops. The variometer Lm is adjusted to cancel out a possible 90° out of phase component of the signal. One minor problem with this approach is that atmospherics would be to a smaller degree reintroduced into the signal channel.

OPERATION

The operation of the communication link in determining the position of the buried transmitter will now be explained with reference to FIGS. 4 and 5. Once the transmitter 1 has been activated (either automatically or manually), the receiver including the double loop is used to determine the position of the buried transmitter. The depth of the transmitter and its distance to the receiver is approximated and the two loops are separated by a distance equal to ½ the estimated depth or by at least 10-20% of the distance from the transmitter, whatever is larger. As shown in FIG. 4, the planes of each of the loops must remain parallel to each other. While remaining parallel, the planes are tilted around a horizontal axis perpendicular to the connecting line to obtain the maximum signal, (angle α measured between the normal of the loop plane and the vertical). To determine the gradient of the field the entire double loop-cable combination is rotated in increments of 15°-30° on the surface and at each position the maximum signal received as function of α is recorded along with compass direction.

The direction of the connecting line 8 between the 2 loops which results in the largest maximum signal is the direction of the gradient, the direction to the transmitter. Perpendicular to the x direction is the y direction exhibiting the smallest maximum signal. The larger the ratio of the signal in the x direction to the signal in the y direction, the larger is also the distance to the transmitter. Additionally, if the maximum signal occurs with the loop-normals nearly perpendicular (α=0, loops nearly parallel to horizontal plane as shown by L1, L2), it indicates that the double loops are at a distance r from the transmitter which is large in comparison to h. L1' and L2' shown in FIG. 4 depict the double loop position at an intermediate distance from the transmitter since α=45. The loops L1 and L2 are moved through positions L1', L2' and L1'', L2'' in the x direction while constantly tilting the plane of the loops for maximum signal while keeping these loops parallel to each other. The loops are moved in the x direction until αmax=90°. This position is shown by L''', L2'''. At this point, the x distance between the center of the cable connecting the two loops and the transmitter is now 0.

While the center position between the two loops is maintained the two loops are rotated 90° until their connecting line is perpendicular to the x direction, parallel to the y-axis, shown as $L1^4$, $L2^4$ in FIG. 5. The angle α for maximum signal is determined and the loops are moved in the y-direction until α=90°. At this point, $L1^5$, $L2^5$, the received signal is independent of the direction of the connecting line the maximum signal is obtained at α=90°. In the absence of soil inhomogenuities/secondary radiators a sharp minimum occurs at α=0.

The apparent depth of the transmitter can also be determined. This is accomplished by maintaining the point equidistant from the loops over the location of the transmitter and then increasing the distance between the loops until the signal reaches a maximum (while maintaining α=90°). The distance between the loops is now twice the apparent depth of the transmitter.

The double loop receiver would also have use in determining the location of ore deposits having high conductivity. The atmospherics themselves penetrate deep enough into the soil to excite eddy currents in the ore. This secondary field replaces the underground transmitter and the double loop receiver cancels out the primary atmospheric field, and receives only information relating to the location of the ore deposits. The manner of determining the exact position of the ore is accomplished similar to that of locating the lost miner. This type of "prospecting" could be done along the surface of the earth or by an airplane flying above the earth.

Furthermore, once the deposit of ore is located, a transmitter equipped with a ferrite antenna is lowered into a drill hole and a surface receiver equipped with the double loop antenna is used to optimize the signal/noise ratio which determines the electromagnetic field around the hole for various depths. A conductivity profile of the soil or ore around the hole is then developed.

Additionally, this system may also operate to detect the presence of a submerged submarine by listening for electromagnetic radiation generated by electrical machines on board.

As will be apparent to persons skilled in the art, various modifications and adaptations of the structure above-described will become readily apparent without departure from the spirit and scope of the invention, the scope of which is defined in the appended claims.

What is claimed is:

1. A communication link comprising:
   (a) a transmitter buried beneath the surface of the earth, said transmitter producing a magnetic field having vertical dipoles; and
   (b) a receiver upon the surface of the earth for receiving the signals produced by said transmitter including an identical double loop antenna connected in a resonant circuit, said double loop antenna rotatable around a horizontal axis perpendicular to the connecting line between said loops, said magnetic field produced by said transmitter reaching both of said loops at substantially the same time, whereby opposing atmospheric noise emf's are eliminated and an optimum signal/noise ratio is produced.

2. A communication link in accordance with claim 1 further including a central loop and a varometer in said receiver.

3. A communication link in accordance with claim 1 further including a capacitor connected between said loops.

4. A communication link in accordance with claim 1 wherein said transmitter generates frequencies in the range of 100-10,000 Hz.

5. A method of locating subsurface individuals equipped with a magnetic field generating transmitter through the use of a surface receiver employing an antenna having two identical loops, comprising the steps of:
   (a) activating the transmitter;
   (b) tilting the two identical loops around a horizontal axis perpendicular to the line connecting the two loops until a maximum signal is obtained;
   (c) rotating the two identical loops in a plane parallel to the earth's surface until a maximum signal is obtained;
   (d) moving the double loops in a straight line towards the transmitter as determined by said rotating step;
   (e) tilting the angle of said double loops at each new location with respect to the horizon for maximum signal until the loops are normal to the surface of the earth;
   (f) rotating the double loops 90°;
   (g) moving the double loops in a straight line in the new direction; and
   (h) tilting the angle of said double loops for each new position with respect to the horizon for maximum signal until the loops are normal to the surface of the earth.

6. A method of locating subsurface individuals in accordance with claim 5 further including the step of estimating the depth of the transmitter and its distance from the receiver and then separating the two loops by a distance of either half as great as the depth of the transmitter or 10-20% of the estimated distance between the transmitter and the receiver before rotating the two identical loops in a plane parallel to the earth's surface before tilting the two identical loops around a horizontal axis perpendicular to the line connecting the two loops.

* * * * *